United States Patent
Shahin

(10) Patent No.: US 11,149,813 B2
(45) Date of Patent: Oct. 19, 2021

(54) HYDRAULIC BRAKE SYSTEM

(71) Applicant: MANDO CORPORATION, Gyeonggi-do (KR)

(72) Inventor: Hatem Shahin, Pfaffenhofen (DE)

(73) Assignee: MANDO CORPORATION, Gyeonggi-Do (KR)

( * ) Notice: Subject to any disclaimer, the term of this patent is extended or adjusted under 35 U.S.C. 154(b) by 82 days.

(21) Appl. No.: 16/658,030

(22) Filed: Oct. 19, 2019

(65) Prior Publication Data

US 2020/0132147 A1 Apr. 30, 2020

(30) Foreign Application Priority Data

Oct. 24, 2018 (DE) .......................... 102018218195.0

(51) Int. Cl.
| | |
|---|---|
| *F16D 55/18* | (2006.01) |
| *F16D 65/18* | (2006.01) |
| *F16D 65/56* | (2006.01) |
| *F16D 125/40* | (2012.01) |
| *F16D 121/04* | (2012.01) |

(Continued)

(52) U.S. Cl.
CPC .......... *F16D 65/18* (2013.01); *F16D 65/567* (2013.01); *F16D 2121/04* (2013.01); *F16D 2121/24* (2013.01); *F16D 2125/06* (2013.01); *F16D 2125/40* (2013.01)

(58) Field of Classification Search
CPC .......... F16D 55/10; F16D 55/18; F16D 55/32; F16D 55/40; F16D 65/0068; F16D 65/18; F16D 65/567; F16D 2055/0016; F16D 2121/04; F16D 2121/24; F16D 2125/08; F16D 2125/36; F16D 2125/40
See application file for complete search history.

(56) References Cited

U.S. PATENT DOCUMENTS

| | | | |
|---|---|---|---|
| 4,058,084 A | 11/1977 | Kawaguchi et al. | |
| 5,105,917 A | 4/1992 | Sporzynski et al. | |

(Continued)

FOREIGN PATENT DOCUMENTS

| | | |
|---|---|---|
| DE | 39 43 106 | 7/1991 |
| DE | 10 2007 051 456 | 4/2009 |

(Continued)

OTHER PUBLICATIONS

Machine translation of DE 102018203308 (no date).*

(Continued)

*Primary Examiner* — Nicholas J Lane
(74) *Attorney, Agent, or Firm* — Ladas & Parry, LLP

(57) ABSTRACT

The invention relates to a hydraulic brake system for a vehicle, comprising a cylinder (3) and a piston (4) movably arranged inside the cylinder (3), wherein the piston (4) has a closed end, an open end (6) and a piston wall surrounding a cavity (8) of the piston (4) between the closed end and the open end (5), the piston (4) being movable along a longitudinal axis (5) of the cylinder (3) by hydraulic pressure within the cavity (8) for pressing at least one brake pad (9) against a brake disc (2). An outer diameter of the piston (4) is smaller in a central section (13) between the open end (6) and the closed end than at the open end (6) and at the closed end so that, in the central section (13), a space (14) remains between the piston wall and an inner wall of the cylinder (3).

12 Claims, 5 Drawing Sheets

(51) Int. Cl.
*F16D 121/24* (2012.01)
*F16D 125/06* (2012.01)

(56) References Cited

U.S. PATENT DOCUMENTS

| | | | | |
|---|---|---|---|---|
| 5,231,916 | A * | 8/1993 | Weiler | B23P 15/10 |
| | | | | 92/172 |
| 6,119,818 | A * | 9/2000 | Krumbeck | B62L 1/00 |
| | | | | 188/24.12 |
| 2011/0315007 | A1* | 12/2011 | Koch | F16J 1/001 |
| | | | | 92/172 |
| 2015/0322971 | A1* | 11/2015 | Kloft | F16J 1/008 |
| | | | | 92/134 |

FOREIGN PATENT DOCUMENTS

| | | | | |
|---|---|---|---|---|
| DE | 10 2010 030 277 | | 2/2011 | |
| DE | 10 2016 011 300 | | 3/2017 | |
| DE | 102018203308 | A1 * | 9/2019 | ............. F16H 25/20 |
| JP | 2006-161905 | | 6/2006 | |
| WO | 2007/048532 | | 5/2007 | |

OTHER PUBLICATIONS

Office Action for DE 10 2018 218195.0 dated Jul. 22, 2019 and its translation by applicant's foreign council.
Office Action dated Nov. 2, 2020 for German Patent Application No. 10 2018 218 195.0 and its English machine translation by Google Translate.

* cited by examiner

[FIG. 1]
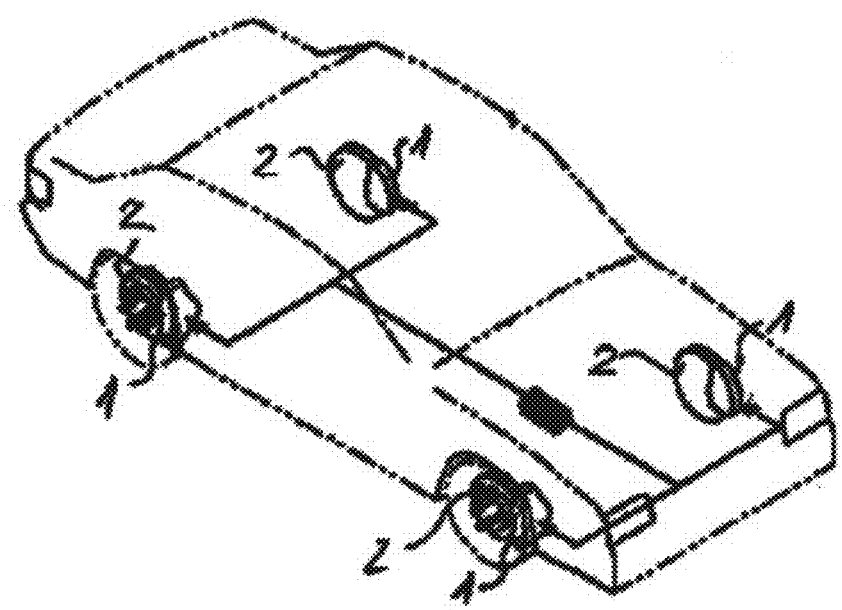

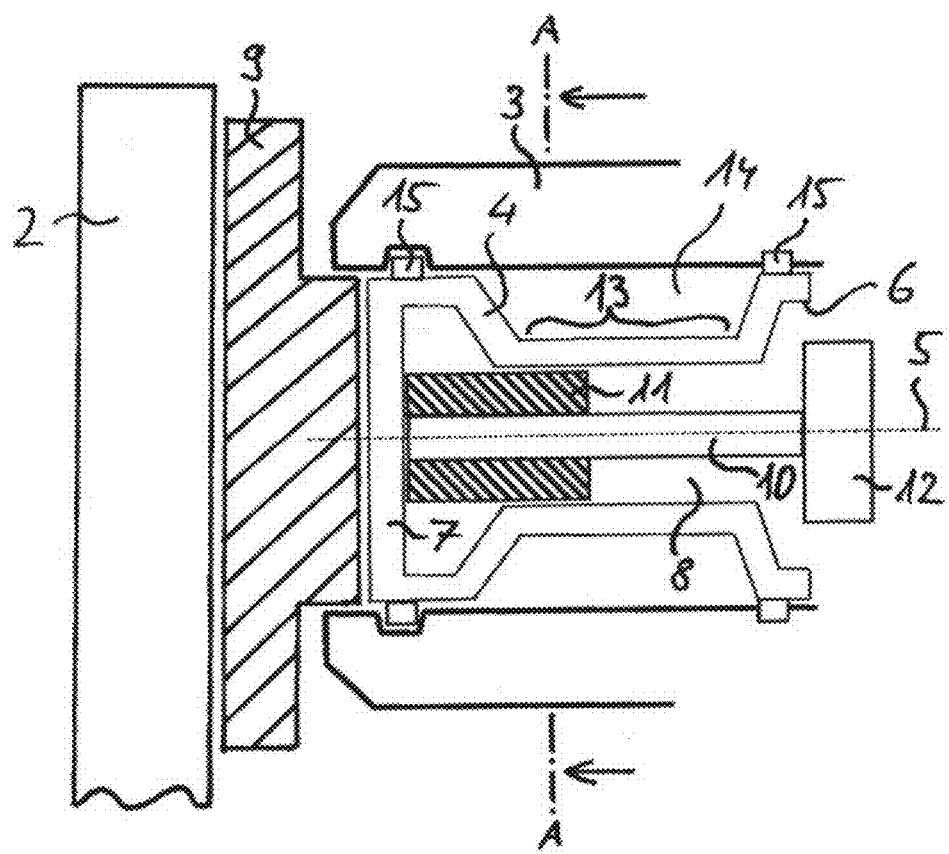
[FIG. 2]

[FIG. 3]
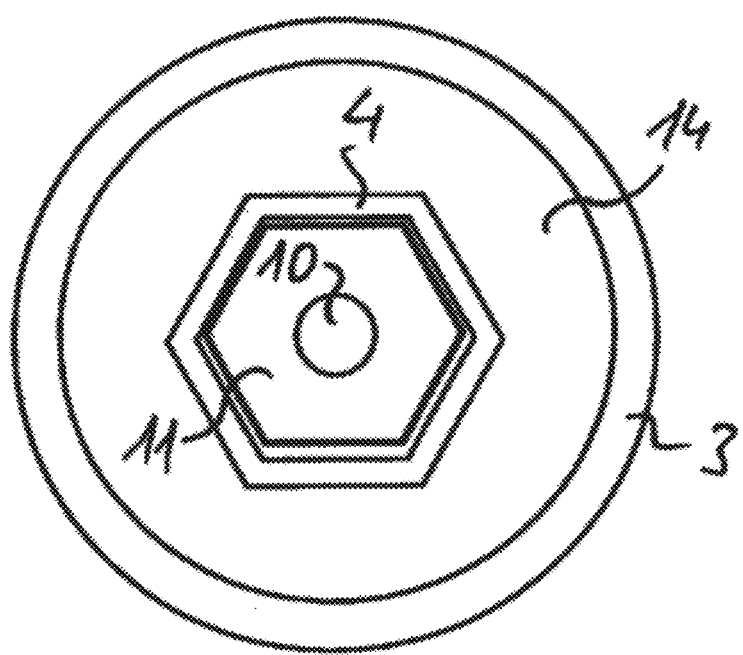

[FIG. 4]
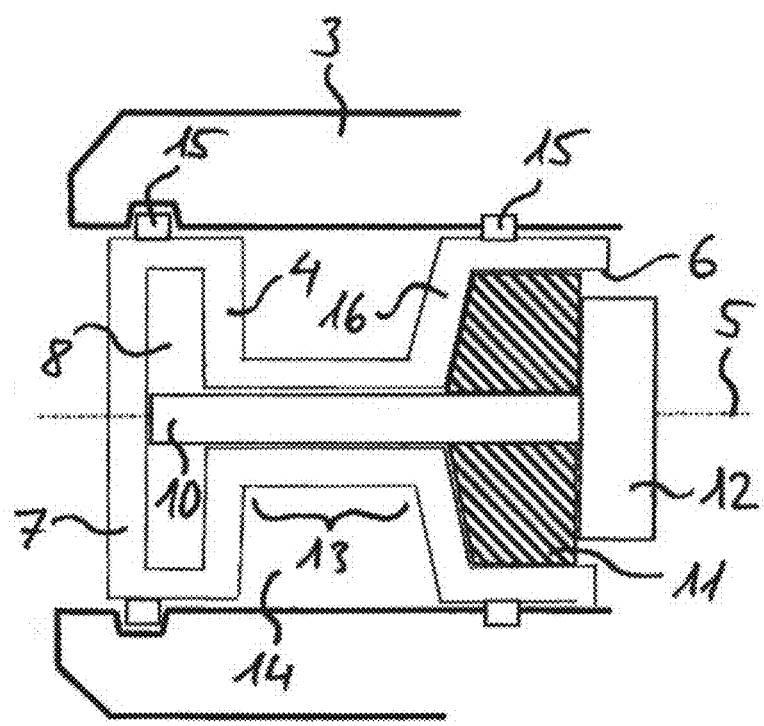

[FIG. 5]
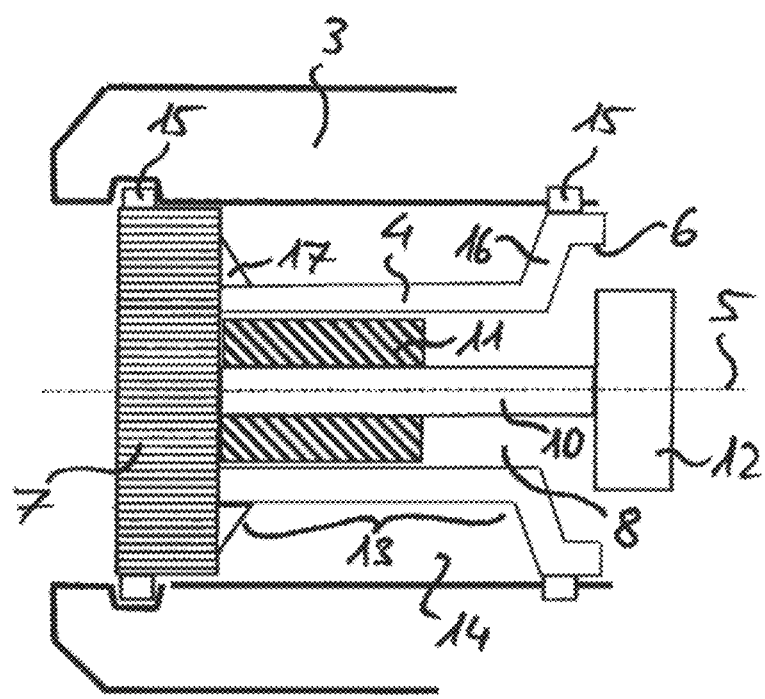

HYDRAULIC BRAKE SYSTEM

The invention relates to the field of vehicular brake systems. Specifically, it relates to a hydraulic brake system which comprises a cylinder and a piston movably arranged inside the cylinder, wherein the piston has a closed end, an open end and a piston wall surrounding a cavity of the piston between the closed end and the open end, the piston being movable along a longitudinal axis of the cylinder by hydraulic pressure within the cavity for pressing at least one brake pad against a brake disc.

As reducing weight of vehicles and their sub-systems has been an issue for a long time already, in particular in view of fuel consumption, different measures have been taken in order to make brake systems of this type lighter. Prior art document WO 2007/048532 A1, for example, discloses such a brake system where a lightweight filling body is provided within the cavity of the piston in order to reduce the amount of hydraulic fluid needed in the system, thereby reducing a total weight of the brake system. Manufacturing this brake system is, however, expensive as a comparatively large number of parts need to be produced and assembled.

It is, therefore, an object of the present invention to suggest a low weight brake system which may be manufactured at comparatively low cost.

According to the invention, this object is achieved by a hydraulic brake system for a vehicle according to the independent claim. Different embodiments of a brake system of this kind may additionally show the features of the dependent claims.

The suggested brake system comprises a cylinder and a piston movably arranged inside the cylinder, wherein the piston has a closed end, an open end and a piston wall surrounding a cavity of the piston between the closed end and the open end, the piston being movable along a longitudinal axis of the cylinder by hydraulic pressure within the cavity for pressing at least one brake pad against a brake disc. According to the invention, an outer diameter of the piston is smaller in a central section between the open end and the closed end than at the open end and at the closed end so that, in the central section, a space remains between the piston wall and an inner wall of the cylinder. Thus, the piston has, so to speak, a waisted shape. The cylinder is supposed to be a wheel brake cylinder and may be an integral part of a brake caliper. In addition, the brake system may comprise the brake disc and the at least one brake pad.

Due to the reduced diameter of the piston in its central section, a volume of hydraulic fluid needed for operating the brake system is reduced without any additional parts and without increasing or at least without significantly increasing a weight of any other component of the brake system. This helps minimizing a total weight of the brake system when in use and, thus, a weight of a vehicle equipped with the brake system. At the same time, the measures suggested with the invention do not or at least not significantly increase manufacturing costs of the brake system.

Typically, the cavity of the piston is narrower in the central section of the piston than in at least one of a section between the central section and the open end and a section between the central section and the closed end. Thus, a shape of the cavity may more or less correspond to a shape of an outer surface of the piston so that the piston wall can be kept thin, which, together with a reduced volume of the cavity, may help minimizing the weight of the brake system.

To be ready for use, the hydraulic brake system may further comprise the hydraulic fluid for exerting the hydraulic pressure within the cavity of the piston, the space between the inner wall of the cylinder and the piston wall in the central section of the piston being free from the hydraulic fluid. In order to keep the said space free from the hydraulic fluid, a seal ring surrounding the piston and being in sealing contact with the piston may close a gap between the inner wall of the cylinder and the piston wall between the central section and the open end. An additional seal ring surrounding the piston may be provided between the central section and the closed end to prevent dust from entering the space between the inner wall of the cylinder and the piston wall. Typically, the seal or at least one of the seals is arranged in a groove which may be provided in the inner wall of the cylinder.

In typical embodiments, a smallest value of the outer diameter of the piston in the central section is smaller than 0.8 times or even smaller than 0.7 times the outer diameter of the piston at the open end and at the closed end. Similarly, a smallest value of an inner diameter of the cavity in the central section can be smaller than 0.8 times or even smaller than 0.7 times a largest value of the inner diameter of the cavity at the open end and/or at the closed end of the piston.

The brake system may further comprise a parking brake mechanism, wherein the parking brake mechanism comprises a spindle and a nut, the spindle being arranged along the longitudinal axis and protruding through the open end of the piston into the cavity and wherein the nut is engaged with the spindle to be movable along the longitudinal axis by a rotation of the spindle for applying or releasing a pressure on the piston and thereby activating or deactivating an integrated parking brake. A parking brake mechanism of this type may be the reason that the piston in the wheel brake cylinder is designed as having an open end and a closed end and a cavity to be at least partly filled with hydraulic fluid. Therefore, the suggested measure of reducing the diameter of the piston in its central section is particularly useful in view of weight reduction in a brake system comprising a parking brake mechanism of this type.

In a plane cutting the nut perpendicular to the longitudinal axis, the cavity may have a non circular cross section, e.g. a hexagonal cross section, which may correspond to a shape of the nut. This helps preventing the nut from turning when the spindle is rotated in order to activate or deactivate the parking brake.

Typically, the nut fits through the central section of the piston to push against an end wall of the piston at its closed end for activating the parking brake. In other embodiments, the nut does not fit through the central section of the piston and is arranged for pressing against a shoulder of the piston between the central section and the open end for activating the parking brake. This allows reducing the inner diameter of the piston in the central section even further.

The piston may be formed in one piece. Alternatively, the piston may be formed of at least two joint parts, one of them being the end wall at the closed end of the piston. The piston or at least one part of it may be a cast part and/or may me made, e.g., of aluminium or aluminium alloy or of another metal or plastic.

Exemplary embodiments of the invention are, hereafter, described referring to FIGS. 1 to 5.

FIG. 1 shows schematically a perspective view of a vehicle with a hydraulic brake system, FIG. 2 shows a cross-sectional view of a detail of the brake system, the shown detail comprising a wheel brake cylinder, a piston and a parking brake mechanism, cut along a longitudinal axis of a wheel brake cylinder, FIG. 3 shows a different cross section of the same detail in a sectional plane designated as A-A in FIG. 2, FIG. 4 shows, in a cross-sectional view corresponding to FIG. 2, a second embodiment of a hydraulic brake system including a parking brake mechanism and FIG. 5 shows, in a cross-sectional view corresponding to FIGS. 2 and 4, a third embodiment of a hydraulic brake system including a parking brake mechanism.

The same or corresponding features are marked by the same reference signs in all Figures. Repeatedly shown identical or corresponding features are not explained again if already explained with respect to another Figure and if the same applies to the different views or embodiments.

The vehicle shown in FIG. 1 has four wheels and a wheel brake for each of the wheels. FIG. 1 shows a brake caliper 1 and a brake disc 2 of each of these wheel brakes, which are of the disc brake type and which are interchangeable. They may be activated not only by hydraulic pressure of a hydraulic fluid but also electrically so that an ordinary hydraulic service brake and an electric parking brake are combined in a brake system of the vehicle.

FIG. 2 shows a detail of the brake system, in particular a cylinder 3, which is a wheel brake cylinder and which is formed by and, thus, an integral part of the brake caliper 1 of one of the wheel brakes, and a piston 4, which is arranged inside the cylinder 3 and which is movable along a longitudinal axis 5 of the cylinder 3. As shown in FIG. 2, the piston 4 has an open end 6 and a closed end, where an end wall 7 of the piston delimits a cavity 8 of the piston 4. The piston 4 can be moved along the longitudinal axis 5, in particular, by hydraulic pressure resulting from brake fluid being pressed into the cylinder 3 and through the open end 5 into the cavity 8 of the piston 4 for pressing at least one brake pad 9 against the respective brake disc 2. The hydraulic pressure of the brake fluid, which is the hydraulic fluid mentioned before, may be generated by an ordinary master cylinder (not shown) and/or by a motor driven pressure supplier (not shown) depending on how far a brake pedal (not shown) of the service brake is pressed down.

The brake system further comprises a parking brake mechanism protruding through the open end 6 into the cavity 8 of the piston 4. The parking brake mechanism comprises a spindle 10, which is arranged along the longitudinal axis 5, and a nut 11 engaged with the spindle 10. The spindle 10 can be driven by an electric motor 12 so that the nut 11 is moved along the longitudinal axis 5 by a rotation of the spindle 10 for applying or releasing a pressure on the end wall 7 of the piston 4 and thereby activating or deactivating the parking brake.

As can be seen in FIG. 2, the piston 4 has a waisted shape by having a smaller outer diameter in a central section 13 between the open 6 end and the closed end than at the open end 6 and at the closed end. Thus, in the central section 13, a ring-shaped space 14 of significant volume remains between a wall of the piston 4 and an inner wall of the cylinder 3. This space 14 remains free from the brake fluid filling the cavity 8.

Two grooves facing the piston 4 are provided in the inner wall of the cylinder 3, and one of two seal rings 15, made of an elastomer, is arranged in each of the grooves so that the seal rings 15 surround the piston 4 being in sealing contact with the piston 4. One of the seal rings 15 is arranged between the central section 13 and the open end 6 in order to prevent the brake fluid from entering the space 14, while the other seal ring 15 is arranged between the central section 13 and the closed end of the piston 4 in order to keep the space 14 free from dust and dirt.

The cavity 8 is narrower in the central section 13 of the piston 4 than in a section between the central section 13 and the open end 6 and in a section between the central section 13 and the end wall 7. To be more precise, due to the particular shape of the piston 4, a smallest value of the outer diameter of the piston 4 in the central section 13 is smaller than 0.7 times the outer diameter of the piston 4 at the open end 6 and at the other end, where the piston is closed by the end wall 7, while an inner diameter of the cavity 8 has a smallest value in the central section 13 which is smaller than 0.7 times a largest value of the inner diameter of the cavity 8, which can be found at the open end 6 as well as in the section between the central section 13 and the closed end of the piston 4.

FIG. 3 shows cross section of same brake system, cut in the central section 13 in a plane which is perpendicular to the longitudinal axis 5 and which is designated as A-A in FIG. 2. As can be seen here, the cavity 8 has, in this plane, a hexagonal cross section, which corresponds to a cross-sectional shape of the nut 11. This prevents the nut 11 from rotating when the spindle 10 is rotated in order to activate or deactivate the parking brake. Furthermore, the nut 11 obviously fits through the central section 13 of the piston 4.

FIG. 4 shows a similar brake system. In this case, the nut 11 does not fit through the central section 13 of the piston 4. Instead, the nut 11, heaving a larger diameter, is arranged for pressing against a shoulder 16 of the piston 4, the shoulder 16 connecting the central section 13 and the aforementioned section between the central section 13 and the open end 6 of the piston 4. When the electric parking brake is activated in this embodiment, the nut 11 pushes against the shoulder 16 of the piston 4 instead of pushing against the end wall 7. A smallest diameter of the cavity 8 is even smaller in this case.

In the embodiments shown in FIGS. 2 to 4, the piston 4 is formed in one piece as a cast part which may be made of aluminium or an aluminium alloy or another metal or plastic.

FIG. 5 shows a further embodiment, which is similar to and works in the same manner as the embodiment shown in FIGS. 2 and 3. In this case, the piston 4 is formed of two joint parts, one of them being the end wall 7, the other part forming a wall surrounding the cavity 8 including the central section 13 of the piston 4, the shoulder 16 and the section between the central section 13 or the shoulder 16 and the open end 6. One or each of the two parts may be a cast part and may be made of aluminium or an aluminium alloy or another metal or plastic. The two parts may be glued, welded or soldered. A stiffener 17 reinforces a connection between the end wall 7 and the other part of the piston 4.

The invention claimed is:

1. A hydraulic brake system for a vehicle, comprising:
a cylinder; and
a piston movably arranged inside the cylinder,
wherein the piston has a closed end, an open end and a piston wall surrounding a cavity of the piston between the closed end and the open end, the piston being movable along a longitudinal axis of the cylinder by hydraulic pressure within the cavity for pressing at least one brake pad against a brake disc,
wherein an outer diameter of the piston is smaller in a central section between the open end and the closed end than at the open end and at the closed end so that, in the central section, a space remains between the piston wall and an inner wall of the cylinder, and
wherein the hydraulic brake system further comprises a parking brake mechanism, wherein the parking brake mechanism comprises a spindle and a nut, the spindle being arranged along the longitudinal axis and protruding through the open end of the piston into the cavity and wherein the nut is engaged with the spindle to be movable along the longitudinal axis by a rotation of the spindle for applying or releasing a pressure on the piston and thereby activating or deactivating an integrated parking brake.

2. The hydraulic brake system of claim 1, wherein the cavity is narrower in the central section of the piston than in at least one of a section between the central section and the open end and a section between the central section and the closed end.

3. The hydraulic brake system of claim 1, further comprising a hydraulic fluid for exerting the hydraulic pressure within the cavity of the piston, wherein the space between the inner wall of the cylinder and the piston wall in the central section of the piston is free from the hydraulic fluid.

4. The hydraulic brake system of claim 1, wherein a seal ring surrounding the piston closes a gap between the inner wall of the cylinder and the piston wall between the central section and the open end.

5. The hydraulic brake system of claim 1, wherein a smallest value of the outer diameter of the piston in the central section is smaller than 0.8 times the outer diameter of the piston at the open end and at the closed end.

6. The hydraulic brake system of claim 1, wherein a smallest value of an inner diameter of the cavity in the central section is smaller than 0.8 times a largest value of the inner diameter of the cavity at the open end and/or at the closed end.

7. The hydraulic brake system of claim 1, wherein, in a plane cutting the nut perpendicular to the longitudinal axis, the cavity has a non-circular cross section.

8. The hydraulic brake system of claim 1, wherein the nut fits through the central section of the piston to push against an end wall of the piston at its closed end for activating the parking brake.

9. The hydraulic brake system of claim 1, wherein the nut does not fit through the central section of the piston and is arranged for pressing against a shoulder of the piston between the central section and the open end for activating the parking brake.

10. The hydraulic brake system of claim 1, wherein the piston is formed in one piece and/or that at least a part of it is a cast part.

11. The hydraulic brake system of claim 7, wherein the nut fits through the central section of the piston to push against an end wall of the piston at its closed end for activating the parking brake.

12. The hydraulic brake system of claim 7, wherein the nut does not fit through the central section of the piston and is arranged for pressing against a shoulder of the piston between the central section and the open end for activating the parking brake.

* * * * *